United States Patent
Torrini et al.

(10) Patent No.: US 7,813,823 B2
(45) Date of Patent: Oct. 12, 2010

(54) COMPUTER AUDIO SYSTEM AND METHOD

(75) Inventors: Antonio Torrini, Austin, TX (US);
Konstantin Shkolnyy, Austin, TX (US);
Andrew Wheeler, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 970 days.

(21) Appl. No.: 11/333,685

(22) Filed: Jan. 17, 2006

(65) Prior Publication Data

US 2007/0168062 A1 Jul. 19, 2007

(51) Int. Cl.
*G06F 17/00* (2006.01)
(52) U.S. Cl. ........................................ 700/94
(58) Field of Classification Search ................. 700/94
See application file for complete search history.

(56) References Cited

U.S. PATENT DOCUMENTS

| | | | | |
|---|---|---|---|---|
| 5,789,689 A * | 8/1998 | Doidic et al. | | 84/603 |
| 5,818,746 A * | 10/1998 | Kentish | | 708/670 |
| 5,963,153 A * | 10/1999 | Rosefield et al. | | 341/61 |
| 6,032,202 A * | 2/2000 | Lea et al. | | 710/8 |
| 6,185,627 B1 * | 2/2001 | Baker et al. | | 710/1 |
| 6,405,255 B1 * | 6/2002 | Stoltz et al. | | 709/231 |
| 6,539,087 B1 * | 3/2003 | Walsh et al. | | 379/202.01 |
| 6,587,823 B1 | 7/2003 | Kang et al. | | |
| 6,611,537 B1 * | 8/2003 | Edens et al. | | 370/503 |
| 6,686,530 B2 * | 2/2004 | Juszkiewicz et al. | | 84/600 |
| 6,754,546 B1 * | 6/2004 | Hindus et al. | | 700/94 |
| 6,983,456 B2 * | 1/2006 | Poznanovic et al. | | 717/133 |
| 7,003,751 B1 * | 2/2006 | Stroomer et al. | | 716/11 |
| 7,039,477 B1 * | 5/2006 | Kamiya et al. | | 700/94 |
| 7,146,104 B2 * | 12/2006 | Farmer | | 398/72 |
| 7,224,184 B1 * | 5/2007 | Levi et al. | | 326/41 |
| 7,251,315 B1 * | 7/2007 | Quinton | | 379/88.17 |
| 7,337,422 B1 * | 2/2008 | Becker et al. | | 716/16 |
| RE40,135 E * | 3/2008 | Walsh et al. | | 379/202.01 |
| 7,376,778 B2 * | 5/2008 | Sinai | | 710/312 |
| 7,403,828 B2 * | 7/2008 | Bader et al. | | 700/94 |
| 7,482,836 B2 * | 1/2009 | Levi et al. | | 326/41 |
| 2002/0019843 A1 * | 2/2002 | Killian et al. | | 709/102 |
| 2002/0154214 A1 * | 10/2002 | Scallie et al. | | 348/51 |
| 2002/0193894 A1 * | 12/2002 | Terada et al. | | 700/94 |
| 2003/0167174 A1 * | 9/2003 | Dagtas et al. | | 704/275 |
| 2003/0236663 A1 * | 12/2003 | Dimitrova et al. | | 704/245 |
| 2004/0039861 A1 * | 2/2004 | Ludtke | | 710/302 |
| 2004/0102861 A1 * | 5/2004 | Han | | 700/94 |
| 2004/0144241 A1 * | 7/2004 | Juskiewicz et al. | | 84/723 |
| 2005/0088934 A1 * | 4/2005 | McPherson et al. | | 369/47.16 |

(Continued)

FOREIGN PATENT DOCUMENTS

EP   1300989 A1 * 4/2003

OTHER PUBLICATIONS

Yamaha, DME 32 operation manual, c 2000.*

*Primary Examiner*—Curtis Kuntz
*Assistant Examiner*—Paul McCord
(74) *Attorney, Agent, or Firm*—Toler Law Group

(57) ABSTRACT

A computer audio system and method is disclosed. The system includes an input to receive a digital audio input signal and a splitter to split the digital audio input signal into a plurality of digital audio signals. The system also includes a plurality of digital signal processing software modules corresponding to a detected number of hardware audio interfaces.

20 Claims, 3 Drawing Sheets

U.S. PATENT DOCUMENTS

| | | | |
|---|---|---|---|
| 2005/0138617 A1* | 6/2005 | Friedman | 717/174 |
| 2005/0149215 A1* | 7/2005 | Deshpande | 700/94 |
| 2005/0228628 A1* | 10/2005 | Bellantoni et al. | 703/13 |
| 2005/0228902 A1* | 10/2005 | Lienhart et al. | 709/248 |
| 2005/0234571 A1* | 10/2005 | Holmes | 700/94 |
| 2005/0254662 A1* | 11/2005 | Blank et al. | 381/58 |
| 2006/0080679 A1* | 4/2006 | Parry | 719/327 |
| 2006/0114136 A1* | 6/2006 | Chu et al. | 341/52 |
| 2006/0149850 A1* | 7/2006 | Bowman | 709/231 |
| 2006/0168159 A1* | 7/2006 | Weisman et al. | 709/220 |
| 2006/0285701 A1* | 12/2006 | Chumbley et al. | 381/104 |
| 2007/0005161 A1* | 1/2007 | Henson et al. | 700/94 |
| 2007/0008896 A1* | 1/2007 | Green et al. | 370/249 |
| 2007/0112942 A1* | 5/2007 | Moquin et al. | 709/220 |
| 2007/0142022 A1* | 6/2007 | Madonna et al. | 455/352 |
| 2007/0239456 A1* | 10/2007 | Goodman et al. | 704/270 |

* cited by examiner

COMPUTER AUDIO SYSTEM AND METHOD

FIELD OF THE DISCLOSURE

The present application relates to computer audio systems and methods.

BACKGROUND

Computer applications may have a variety of audio functions. For example, some computer applications may use audible cues to inform application users of certain system or application events, such as a user error. Other computer applications may incorporate more elaborate audio functions. For example, some audio applications may allow for editing, processing, and playback of music files.

The audio functions are typically provided to a user through an audio hardware device, such as a sound card. Audio device drivers are used by computers to control the audio hardware device. The device driver can receive an audio stream from a computer application, process the audio stream, and provide the processed result to the audio hardware. The audio hardware may perform further processing, and provide the audio stream to an output device via a hardware interface. Typical output devices include speakers, headphones, and Sony/Philips Digital Interface (SPDIF) devices. However, providing the same audio data stream to different hardware interfaces at the audio hardware may result in poor performance of the output device, and a poor user experience.

DESCRIPTION OF THE DRAWINGS

A computer audio system and method is disclosed. The system includes an input to receive a digital audio input signal and a splitter to split the digital audio input signal into a plurality of digital audio signals. The system also includes a plurality of digital signal processing software modules corresponding to a detected number of hardware audio interfaces.

The method includes receiving a digital audio input signal, detecting a number of hardware interfaces and splitting the digital audio input signal into a plurality of digital audio signals corresponding to the detected number of hardware interfaces. The method further includes dynamically creating a number of digital signal processing software modules corresponding to the plurality of digital audio signals.

Figure 1:
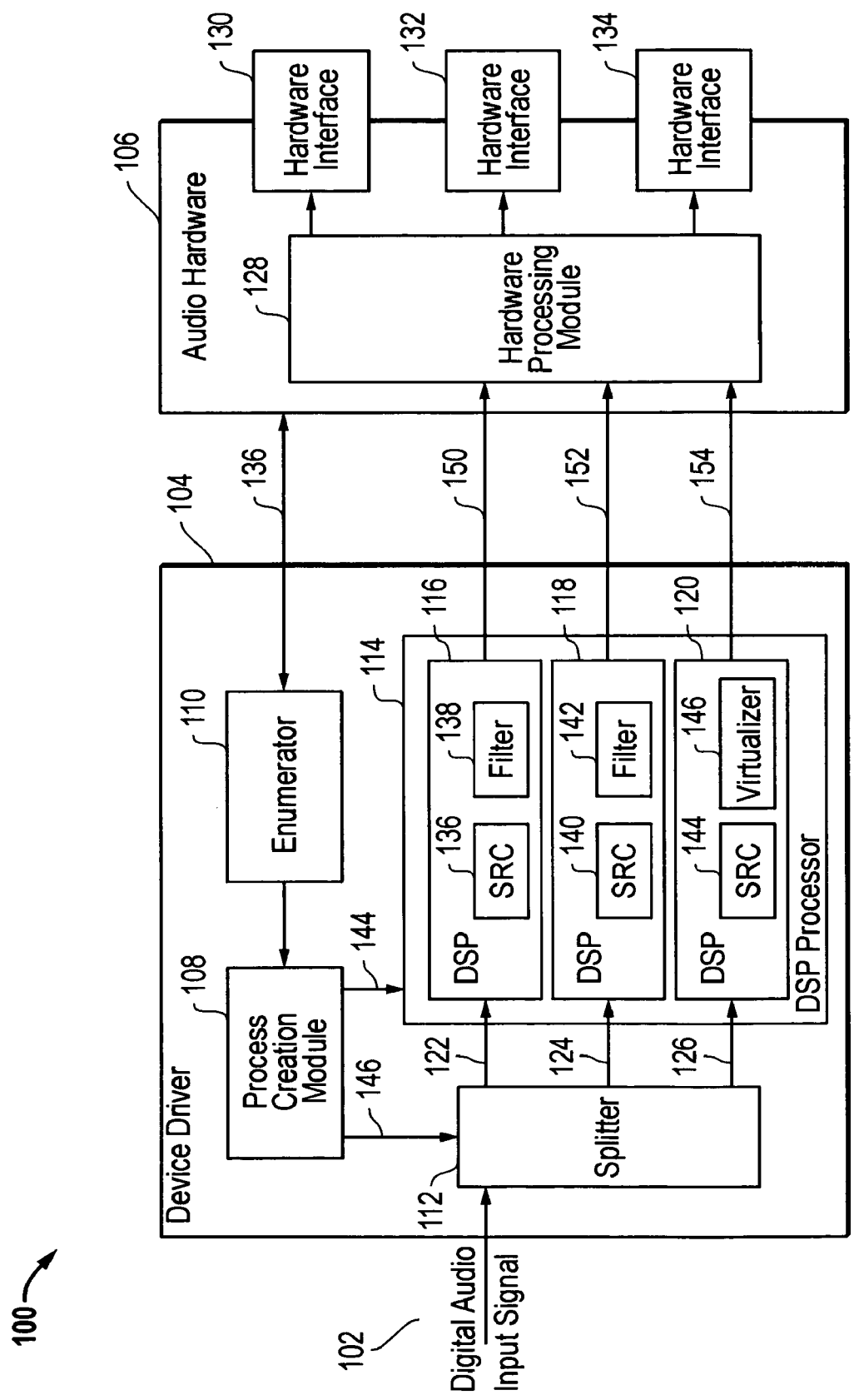
FIG. 1 is a block diagram of a particular embodiment of a computer audio system.

Referring to FIG. 1, a computer audio system 100 is illustrated. The system 100 includes a device driver 104 and audio hardware 106. In a particular embodiment, the audio hardware is a sound card. The device driver 104 includes a process creation module 108, an enumerator 110, and a splitter 112. The device driver 104 also includes a digital signal processor (DSP) module 114. The DSP processor 114 includes a first DSP 116, a second DSP 118, and a third DSP 120. The first DSP 116 includes a sample rate converter 136 and a filter 138. The second DSP 118 includes a sample rate converter 140 and a filter 142. The third DSP 120 includes a sample rate converter 144 and a virtualizer 146. The number of DSPs are illustrated as an example. As will be explained, there may be more or fewer DSPs depending on the number of hardware interfaces of the audio hardware 106.

The audio hardware 106 includes a hardware processing module 128, a first hardware interface 130, a second hardware interface 132, and a third hardware interface 134. The hardware interfaces 130, 132 and 134 are responsive to the hardware processing module 128. The hardware processing module 128 is coupled to the DSP processor 114 via interfaces 150, 152, and 154.

The device driver 104 receives a digital audio input signal 102. The splitter 112 is responsive to the digital audio input signal 102. The splitter 112 provides one or more digital audio signals (e.g. the signals 122, 124 and 126) to the DSP module 114. The splitter 112 and the DSP module 114 are responsive to the process creation module 108. The enumerator 110 is coupled to the audio hardware 106, and provides a control signal to the process creation module 108.

During operation, the device driver 104 processes the digital audio input signal 102 and controls the audio hardware 106 to output audio based on the digital audio input signal. The device driver 104 may be a software module that is responsive to another software application. For example, the digital audio input signal 102 may be an audio information stream provided by a software application, such as a music application. The device driver 104 may control the audio hardware 106 to output audio information based on the digital audio input signal via one or more hardware interfaces, such as the hardware interfaces 130, 132 and 134.

To process the digital audio input signal 102, the process creation module 108 instructs the DSP module 114 to create a number of DSP sub-modules, such as the first DSP 116. the number of DSP submodules may correspond to the number of hardware interfaces incorporated in the audio hardware 106. Each DSP sub-module can individually process the digital audio input signal 102 and provide an individually processed audio signal to the audio hardware 106. The audio hardware 106 can provide the individually processed audio signal to the appropriate hardware interface. Each DSP sub-module can thereby process the digital audio input signal according to the particular characteristics of the corresponding hardware interface.

For example, a first of the hardware interfaces of the audio hardware 106 may operate advantageously at a particular sample rate, while a second of the hardware interfaces operates at another sample rate. The individual DSP processes of the DSP processor 114 can individually adjust the sample rate of the digital audio input signal 102 to correspond to the particular sample rate for each hardware interface.

To create the individual DSP sub-modules, the enumerator 110 may detect the number of hardware interfaces of the audio hardware 106. In the illustrated embodiment, the enumerator 110 detects three hardware interfaces that correspond to the first hardware interface 130, the second hardware interface 132 and the third hardware interface 134. The enumerator 110 provides a notification of the number of hardware interfaces to the process creation module 108. The notification can include providing a variable or other information to a process creation subroutine, or other appropriate notification method. The enumerator 110 may detect the hardware interfaces in a variety of ways. For example, the enumerator 110 may initiate a software query to the audio hardware 106, and the audio hardware 106 may respond to the software query by transmitting data to the enumerator 110 that includes the number of hardware interfaces. Alternatively, the enumerator 110 may perform a hardware analysis on the audio hardware 106 during a start-up procedure. As part of this hardware analysis, the enumerator 110 may determine the number of hardware interfaces.

The process creation module 108 provides an instruction to the DSP processor 114 to create a number of DSP sub-modules that correspond to each of the detected hardware interfaces. As illustrated in FIG. 1, three DSP sub-modules 116, 118, and 120 are created to correspond to the three hardware interfaces 130, 132, and 134 of the audio hardware 106. The DSP sub-modules may be created in different ways. For example, the DSP sub-modules 116, 118, and 120 may be created by creating a number of software subroutines or objects corresponding to each DSP sub-module. The software subroutines or objects may be similar routines that include different input parameters, such as a desired sample rate, filtering characteristics, or other input parameter.

In addition, the process creation module 108 provides an instruction to the splitter 112 to split the digital audio input signal 102 into a corresponding number of output signals. The splitter 112 may split the digital audio input signal 102 in a variety of ways. For example, the splitter 112 may create duplicates of the digital audio input signal 102 and provide each duplicate to a corresponding DSP sub-module. Alternatively, the splitter 112 may buffer the digital audio input signal 102, and allow each of the DSP sub-modules access to the buffer. The splitter 112 may split the audio input signal 102 in other ways without departing from the scope of the present disclosure.

Each of the DSP modules, including the first DSP 116, the second DSP 118 and the third DSP 120 can include a sample rate converter. The first sample rate converter 136 of the first DSP 116 may convert a sample rate of the first split audio input signal 122, while the sample rate converter 140 of the second DSP 118 may convert a sample rate of the second split audio input signal 124. The sample rate converters 136 and 140 may convert the sample rates of the input signals independently, so that the output signals 150 and 152 have different sample rates. For example, the first sample rate converter 136 can adjust the first split audio input signal 122 by a first adjustment amount, while the second sample rate converter 140 can adjust the second split audio input signal 124 by a second adjustment amount.

The sample rate converters 136 and 140 may convert the sample rate of their respective input signals in a variety of ways. For example, the sample rate converters may interpolate the respective input signals to increase the sample rate. Alternatively, the sample rate converters may decimate the respective input signals to reduce the sample rate. Because the sample rate converters 136 and 140 may operate independently, one of the converters may perform an interpolation while the other converter performs a decimation operation.

In addition, the first DSP 116 and the second DSP 118 each include a filter. The first filter 138 may perform a filtering operation on an output of the first sample rate converter 136. The second filter 142 may perform a filtering operation on an output of the second sample rate converter 140. The characteristics of the filter 138 and the filter 142 may differ from each other so that the resulting output signals 122 and 124 may be filtered independently.

The third DSP 120 includes a virtualizer 146. The virtualizer 146 may create a virtual sound environment. For example, in a particular embodiment the virtualizer 146 may perform operations on the third split audio input signal 126 to create a virtual surround sound environment. In a particular embodiment, the virtualizer 146 is a Dolby Headphone module. In another particular embodiment, the virtualizer 146 is a Dolby Digital Live module. In still another particular embodiment, the virtualized output signal 154 is associated with a hardware interface 134 to a set of headphones.

The independently processed output signals 150, 152 and 154 are provided to the hardware processing module 128 of the audio hardware 106. The hardware processing module 128 may perform additional processing on the output signals. The hardware processing module 128 may then provide the processed output signals to individual hardware interfaces such as the hardware interface 130, 132 and 134. In this way, it is possible for each of the hardware interfaces to receive a digital audio signal that has been independently processed. This allows individualized and specialized processing of the signals according to the appropriate hardware interface. For example, the first hardware interface 130 may be an analog hardware interface and the second hardware interface 132 may be a digital hardware interface. By processing the digital audio input signal 102 independently at each of the DSP modules, the outputs of the device driver may be specifically tailored for the various hardware interfaces of the audio hardware 106.

Figure 2:
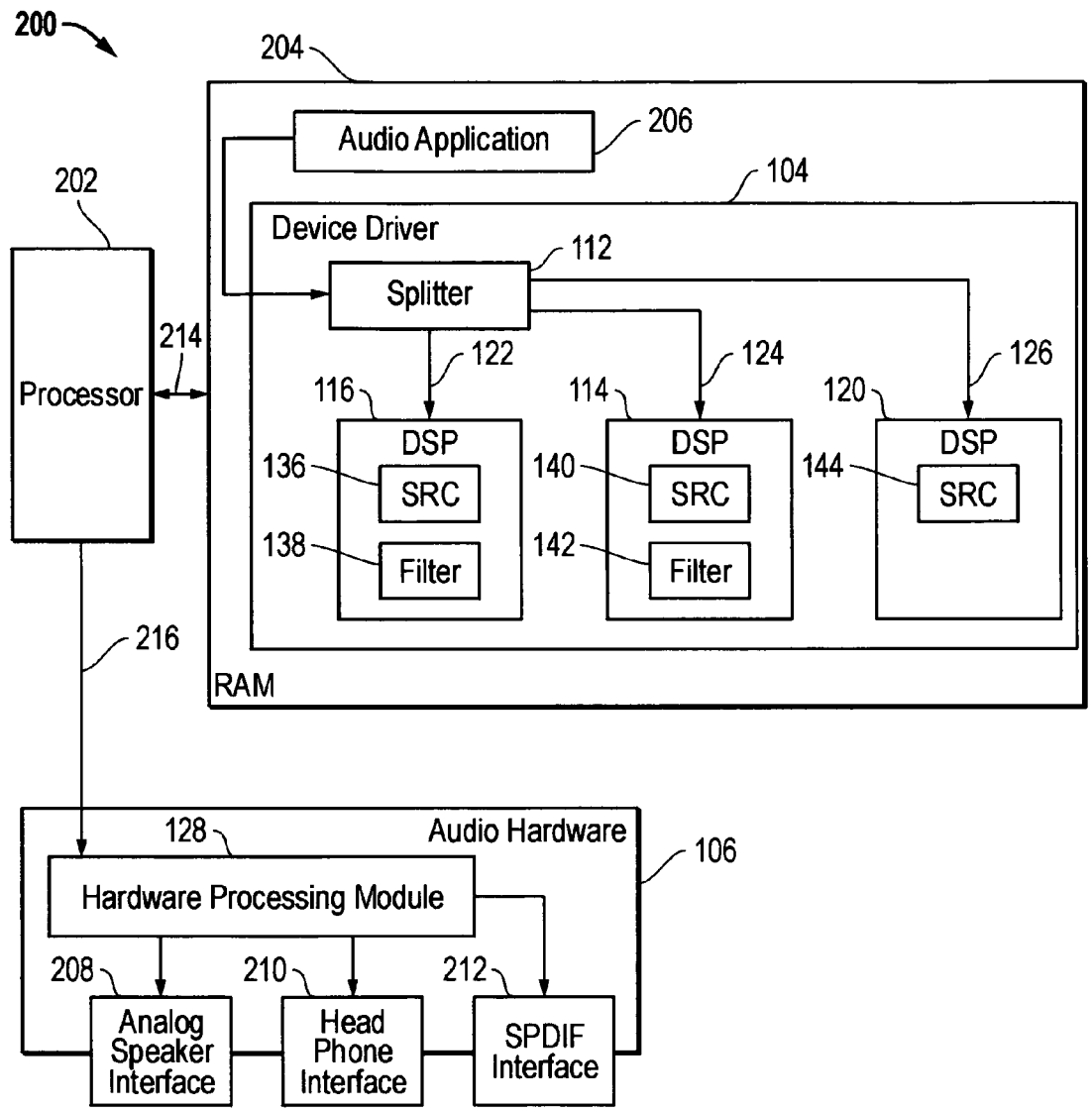
FIG. 2 is a block diagram of a particular embodiment of a computer system that implements a computer audio system, such as the computer audio system of FIG. 1.

Referring to FIG. 2, a computer system 200 that implements a computer audio system, such as the computer audio system of FIG. 1, is illustrated. The system 200 includes a processor 202 and a memory 204. In a particular embodiment the memory 204 is a random access memory (RAM). The RAM 204 includes data representative of an audio application 206 and a device driver 104. The RAM 204 is accessible to the processor 202. The audio hardware 106 is responsive to the processor 202. The audio hardware 106 includes the hardware processing module 128 and also includes an analog speaker interface 208, a headphone interface 210, and an SPDIF interface 212.

During operation, the audio application 206 is executed by the processor 202. In a particular embodiment, the audio application 206 includes a number of instructions. The audio application 206 may be any of a variety of audio applications, such as a music application, a computer game application, a system application, or other appropriate application.

The audio application 206 utilizes the device driver 104 to provide audio signals via one or more audio outputs. The audio signals may represent system sounds, music, or other audio information. The device driver 104 controls the audio hardware 106 to provide the audio signals to one or more audio output devices. The audio signals are provided to the audio output devices via hardware interfaces, such as the analog speaker interface 208, the headphone interface 210, and the SPDIF interface 212. Each of the hardware interfaces may have different characteristics, and may operate advantageously with an audio input signal that has been individually processed for the particular interface. For example, the analog speaker interface 208 may operate advantageously with an audio input signal based on a digital signal with a particular sample rate. Similarly, the SPDIF interface 212 may operate advantageously by receiving an audio input signal at a particular sample rate that is different from the sample rate associated with the analog speaker interface 208.

To provide independent signals to each of the hardware interfaces, the device driver 104 is capable of processing, via the processor 202, a plurality of digital audio data streams independently. The device driver 104 receives a digital audio input signal from the audio application 206. The digital audio input signal may comprise an audio stream, audio data, or other appropriate input. The splitter 112 of the device driver 104 splits the digital audio input signal into audio input signals 122, 124 and 126.

Each of these audio input signals are provided to a corresponding DSP module. Each of the DSP modules 116, 118 and 120 is associated with one of the hardware interfaces 208, 210, and 212. Further, each of the DSP modules 116, 118 and 120 can independently process an audio input signal according to the particular characteristics of the associated hardware interface. For example, the DSP module 116 may be associated with the analog speaker interface 208, and may process the audio input signal 122 according to the characteristics of the analog speaker interface 208.

Further, each of the DSP modules may be controlled by the audio application 206. For example, the audio application 206 may control the DSP module 116 to process the audio input signal 122 in a particular way (such as adjusting the sample rate of the input signal to a particular rate) and may control the DSP module 114 to process the audio input signal 124 in another way (such as adjusting the sample rate to of the input signal to a different particular rate). This permits the audio application to have enhanced control over the hardware interfaces of the audio hardware 106.

After the audio signals 122, 124, and 126 have been independently processed they are provided to the audio hardware 106 via the processor 202. The individually processed audio signals are then further processed by the hardware processing module 128. The audio signals are then provided to the corresponding hardware interface, such as the analog speaker interface 208, the headphone interface 210, and the SPDIF interface 212, for output to corresponding audio devices (not shown).

Figure 3:
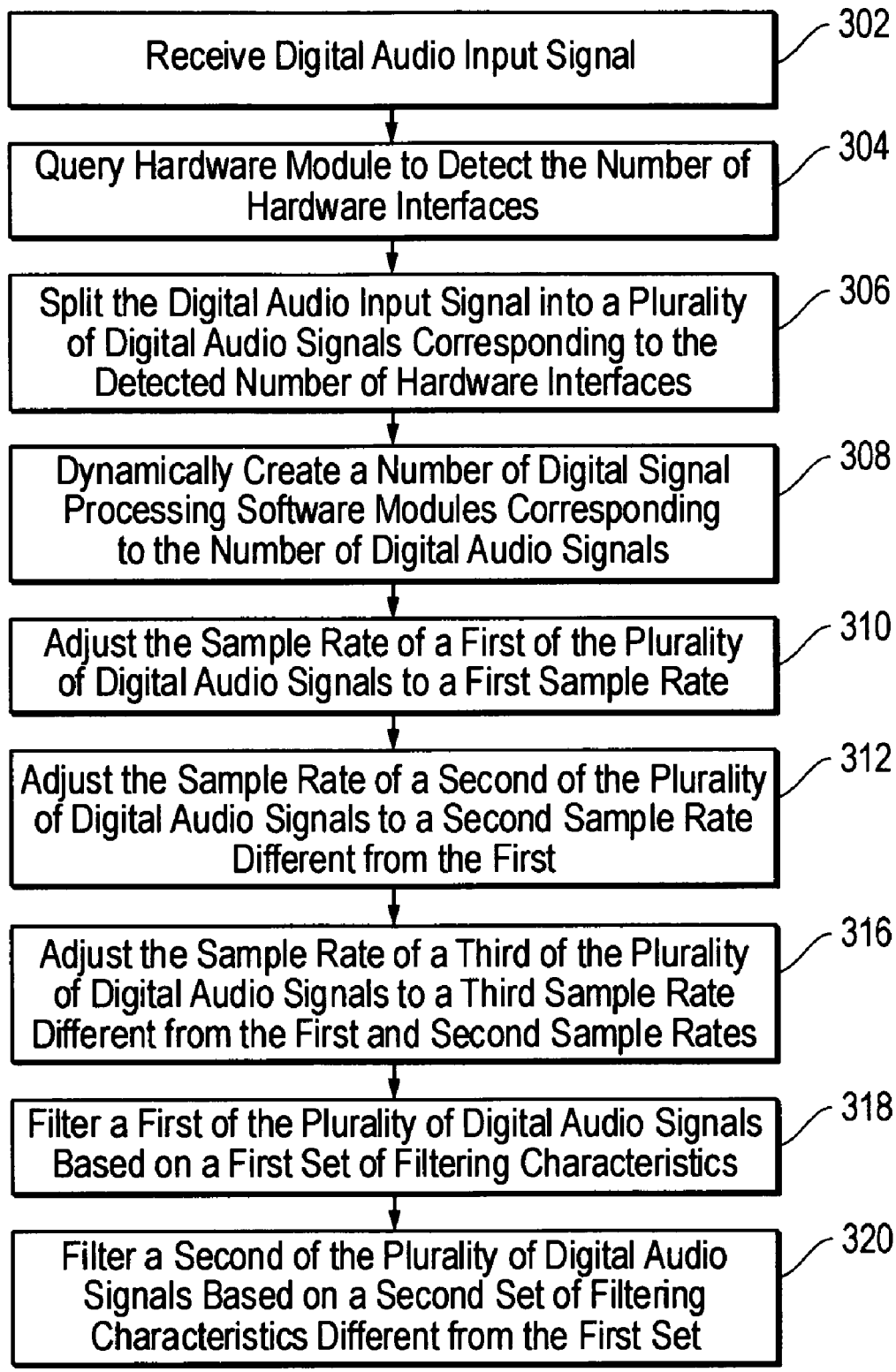
FIG. 3 is a flow chart of a method of processing a digital audio signal in a computer audio system.

Referring to FIG. 3, a method of processing a digital audio signal is illustrated. At step 302, a digital audio input signal is received. The digital audio input signal may be based on a music file, a system sound file, or other audio source. At step 304 a hardware module is queried to detect the number of hardware interfaces of a hardware device. The hardware interfaces may correspond to a variety of audio outputs of a system. Each of the hardware interfaces may have different audio characteristics. By tailoring an output audio signal to the particular hardware interface, improved system performance may result.

Proceeding to step 306, the digital audio input signal is split into a plurality of digital audio signals corresponding to the detected number of hardware interfaces. Splitting the input signal into the plurality of digital audio signals allows each audio signal to be individually processed according to a corresponding hardware interface. At step 308, a number of digital signal processing software modules are dynamically created. The number of digital signal processing software modules may correspond to the number of digital audio signals detected. The digital signal processing software modules can independently process each of the plurality of digital audio signals.

Moving to step 310, a sample rate of a first of a plurality of digital audio signals is adjusted to a first sample rate by a first of the digital signal processing software modules. The first sample rate may be selected to correspond to a desired sample rate associated with one of the hardware interfaces. In a particular embodiment, the first sample rate is about 48 kilohertz.

At step 312, the sample rate of a second of the plurality of digital audio signals is adjusted to a second sample rate by a second of the digital signal processing modules. The second sample rate is different from the first sample rate. Moving to step 316, the sample rate of the third of the plurality of digital audio signals is adjusted to a third sample rate by a third of the digital signal processing modules. The third sample rate is different from the first and second sample rates. In this way, the plurality of digital audio signals are independently processed to correspond to the audio characteristics of the hardware interfaces.

Proceeding to step 318, the first of the plurality of digital audio signals is filtered by the first of the digital signal processing software modules and based on a first set of filtering characteristics. Moving to step 320, a second of the plurality of digital audio signals is filtered based on a second set of filtering characteristics by the second of the digital signal processing modules. The second set of filtering characteristics is different from the first set. The filtering characteristics may be selected to correspond to a desired set of characteristics associated with one of the hardware interfaces. By filtering the digital audio signals individually, the audio signals may be processed according to the particular characteristics of the associated hardware interface. This can improve the performance of the audio system.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    an input to receive a digital audio input signal;
    a splitter to split the digital audio input signal into a plurality of digital audio signals; and
    a plurality of digital signal processing (DSP) software modules corresponding to a detected number of hardware audio interfaces, wherein the plurality of DSP software modules are dynamically created such that a number of the DSP software modules that are dynamically created is equal to the detected number of hardware audio interfaces, wherein a first DSP software module of the plurality of DSP software modules includes a first sample rate converter that adjusts a sample rate of a first digital audio signal, wherein a second DSP software module of the plurality of DSP software modules includes a second sample rate converter that adjusts a sample rate of a second digital audio signal, and wherein the first sample rate converter and the second sample rate converter operate independently such that a first output signal associated with the first digital audio signal and a second output signal associated with the second digital audio signal have different sample rates.

2. The system of claim 1, further comprising:
    an enumerator to detect the number of hardware audio interfaces.

3. The system of claim 2, wherein the plurality of DSP software modules are dynamically created based on an output of the enumerator.

4. The system of claim 1, wherein the first sample rate converter adjusts the sample rate of the first digital audio signal by a first adjustment amount to generate the first output signal with a first adjusted sample rate.

5. The system of claim 4, wherein the second sample rate converter adjusts the sample rate of the second digital audio signal by a second adjustment amount to generate the second output signal with a second adjusted sample rate, wherein the second adjustment amount is different from the first adjustment amount.

6. The system of claim 1, wherein the first DSP software module includes a first digital filter.

7. The system of claim 6, wherein the second DSP software module includes a second digital filter, and wherein one or more filter characteristics of the first digital filter are different from corresponding filter characteristics of the second digital filter.

8. The system of claim 1, wherein the first DSP software module includes an audio virtualizer.

9. A method comprising:
receiving a digital audio input signal;
detecting a number of hardware audio interfaces;
splitting the digital audio input signal into a plurality of digital audio signals corresponding to the detected number of hardware audio interfaces; and
dynamically creating a number of digital signal processing (DSP) software modules corresponding to the plurality of digital audio signals such that the number of DSP software modules that are dynamically created is equal to the detected number of hardware audio interfaces, wherein a first DSP software module of the plurality of DSP software modules includes a first sample rate converter that adjusts a sample rate of a first digital audio signal, wherein a second DSP software module of the plurality of DSP software modules includes a second sample rate converter that adjusts a sample rate of a second digital audio signal, and wherein the first sample rate converter and the second sample rate converter operate independently such that a first output signal associated with the first digital audio signal and a second output signal associated with the second digital audio signal have different sample rates.

10. The method of claim 9, further comprising:
querying a hardware module to detect the number of hardware audio interfaces.

11. The method of claim 9, further comprising:
filtering the first digital audio signal of the plurality of digital audio signals based on a first set of filtering characteristics.

12. The method of claim 11, further comprising:
filtering the second digital audio signal of the plurality of digital audio signals based on a second set of filtering characteristics, wherein the second set of filtering characteristics is different from the first set of filtering characteristics.

13. A system comprising:
a processor;
a memory accessible to the processor;
a hardware module responsive to the processor, the hardware module including a plurality of hardware audio interfaces;
a device driver to control the processor, wherein the device driver comprises:
a splitter to split a received digital audio input signal into a plurality of digital audio signals; and
a plurality of digital signal processor (DSP) software modules corresponding to a detected number of the plurality of hardware audio interfaces, wherein the plurality of DSP software modules are dynamically created such that a number of the DSP software modules that are dynamically created is equal to the detected number of the plurality of hardware audio interfaces, wherein a first DSP software module of the plurality of DSP software modules includes a first sample rate converter that adjusts a sample rate of a first digital audio signal, wherein a second DSP software module of the plurality of DSP software modules includes a second sample rate converter that adjusts a sample rate of a second digital audio signal, and wherein the first sample rate converter and the second sample rate converter operate independently such that a first output signal associated with the first digital audio signal and a second output signal associated with the second digital audio signal have different sample rates.

14. The system of claim 13, wherein the plurality of hardware audio interfaces includes an analog speaker interface, a headphone interface, and a Sony/Philips Digital Interface (SPDIF).

15. The system of claim 1, wherein a third DSP software module of the plurality of DSP software modules includes a virtualizer that performs operations on a third digital audio signal of the plurality of digital audio signals to create a virtual surround sound environment.

16. The system of claim 15, wherein the virtualizer is a Dolby Headphone module.

17. The system of claim 15, wherein the virtualizer is a Dolby Digital Live module.

18. The system of claim 4, wherein the first sample rate converter interpolates the first digital audio signal to increase the sample rate of the first digital audio signal.

19. The system of claim 4, wherein the first sample rate converter decimates the first digital audio signal to decrease the sample rate of the first digital audio signal.

20. The system of claim 5, wherein the first sample rate converter interpolates the first digital audio signal to increase the sample rate of the first digital audio signal, and wherein the second sample rate converter decimates the second digital audio signal to decrease the sample rate of the second digital audio signal.

* * * * *